May 10, 1927.  1,628,396

H. W. DYER

FIGURE WHEELED TOY

Filed Dec. 18, 1925

Harry W. Dyer — INVENTOR.

BY

M. A. Langridge — ATTORNEY.

Patented May 10, 1927.

1,628,396

UNITED STATES PATENT OFFICE.

HARRY W. DYER, OF NEW YORK, N. Y.

FIGURE WHEELED TOY.

Application filed December 18, 1925. Serial No. 76,307.

Figure 1:
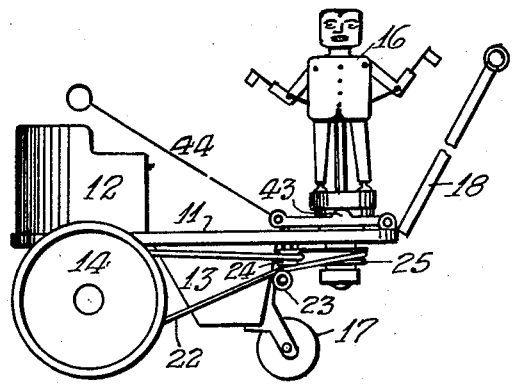
Figure 2:
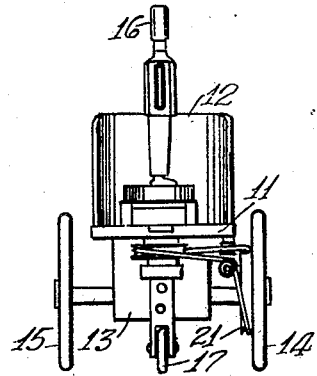
Figure 3:
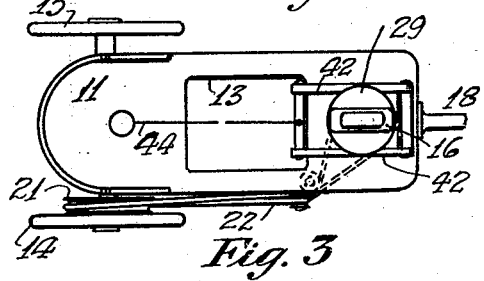
Figure 4:
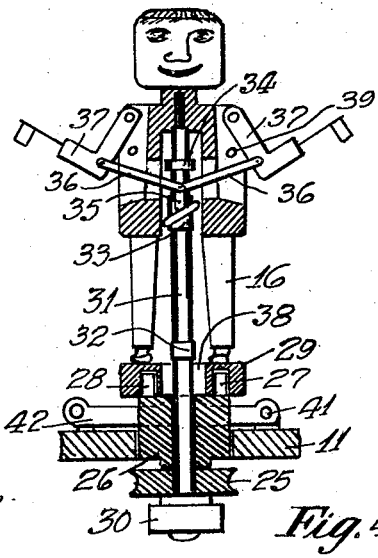
Figure 5:
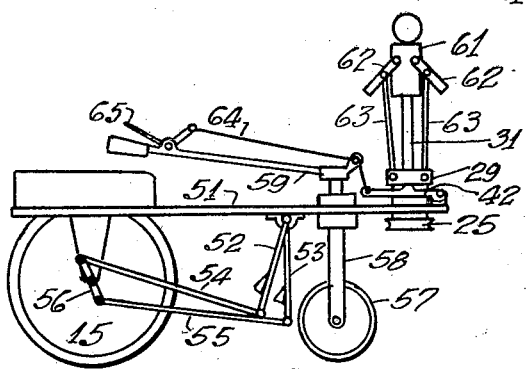

This invention relates to children's vehicles and has for an object to incorporate with a vehicle of this type an amusing figure which may be operated by the movement of the vehicle and may be independently operated by the rider. The figure is constructed as a detachable part of the vehicle and may be readily removed and replaced. These and other objects of the invention will be more particularly understood from the following specification and the accompanying drawings in which, Fig. 1, is a side elevation, Fig. 2 is an end view and Fig. 3 is a plan view of a vehicle constructed according to my invention; Fig. 4 is a detail of the construction and Fig. 5 is a vehicle with a propelling mechanism embodying my invention.

This invention includes the application to a vehicle which may be drawn or propelled by the rider, of a figure which may be arranged to rotate and move its limbs, the rotation being obtained from the movement of the vehicle and the movement of the limbs may be obtained by rotation and controlled by the rider.

Referring to the drawings, 11 represents the body of the vehicle upon which the back of the seat 12 in mounted. This body is provided with a well 13 for the feet of the rider and is moved on the wheels 14 and 15. The animal figure or mannikin 16 is mounted in front of the rider so that its movements may engage the attention of a child on the seat. The vehicle rests upon the wheel 17 and is drawn by the handle 18.

A belt wheel 21 is provided on one of the running wheels as 14 which moves the belt 22 over the guide pulleys 23 and 24 and around the belt wheel 25 which operates the mannikin. The stem 31, Fig. 4 is rigidly supported by the bracket 30. The belt wheel 25 and core 26 are rigidly connected together and move freely on the stem 31. The core 26 carries the pins 27 and 28 which engage slots in the base 29 of the figure 16. This causes the entire figure to rotate with the pulley 25 as the vehicle proceeds along the ground.

The stem 31 is provided with a cam 33 which engages the slide 35 having the collar 34 which slides on stem 31 by a vertical movement. The rods 36—36 are attached to 35 and to the arms 37—37 pivoted to the figure so that the up-and-down movement of 35 causes a corresponding movement of the arms 37. As the stem 31 and the cam 33 are stationary it is apparent that as the figure rotates the limbs are moved. Additional cams may be added, of course, where additional movements are desired.

It will be observed that the centre of the figure is hollow to receive the cam and that the opening 38 in the base 29 is large enough to pass over the cam 33 so that the entire figure may be removed by lifting it off the stem. The upper part of stem 31 may also be disconnected at the union 32 for the purpose of economizing on space.

An arrangement is provided whereby the rider may vary the action of the limbs and may stop the rotation of the figure as the vehicle proceeds. This is secured by the frame 42 pivoted to 11 at 41 and which may be raised on its pivot from the rider's seat by the cord 44. A rounded portion 43 on each side of the frame engages the underside of the base 29 so that as the frame is raised the figure is raised with it. As the figure rises, the arms 37 fall back against the stops 39 so that 35 does not ride upon the cam all the way around, hence the movement of the arms is varied according to the height the frame 42 is raised. If this frame is raised high enough the pins 27 and 28 will be released from the base 29 and the figure will cease to rotate while it will remain rigidly supported on stem 31. The movement of the figure is thus under the control of the movement of the vehicle and independently under the control of the rider.

In Fig. 5 my invention is shown with a propelling and steering mechanism. The body 51 supports hangers 52 and 53 which are provided with pedals; these hangers are connected by rods 54 and 55 with the crank 56 on the axle of the running wheel 15. The steering wheel 57 is supported by the fork 58 which is directed by the steering handle 59. The mannikin 61 is supported on stem 31 and has limbs 62—62 connected by 63—63 with the base 29. This base is raised by frame 42 through connection 64 and latch handle 65. The figure may be rotated by the pulley 25, however, as shown, the limbs 62 are moved by the latch handle without regard to rotation of the figure.

Having thus described my invention, I claim:

1. A figure wheeled toy of the class described including a body mounted upon wheels, a figure slidably mounted for elevation upon said body and operatively connected with one of said wheels, by a mechanism for rotating said figure, movable parts on said figure operated by the rotation of said figure and a member for varying the elevation of said figure whereby the movement of said parts is varied.

2. A figure wheeled toy of the class described including a body mounted upon wheels, a vertical stem rigidly supported by said body and having a cam fixed thereon, a figure comprising moving parts mounted to rotate about said stem and a belt drive connecting said figure with one of the wheels of said body, said moving parts being operated by said cam as said figure rotates.

3. A figure wheel toy of the class described including a body mounted upon wheels, a vertical stem rigidly supported by said body and having a cam fixed thereon, a figure comprising moving parts mounted to rotate and slide about said stem and connected by a belt drive with one of the wheels of said body, said moving parts being operated by said cam and a member on said body for varying the relation of said figure to said cam.

4. A figure wheeled toy of the class described including a body mounted upon wheels, a vertical stem having a cam rigidly supported by said body, a vertical sliding member engaging said cam, a figure having pivotally connected members operated by said sliding member, means operatively connecting said figure with a wheel of said toy and independent means for varying the height of said figure relative to said cam.

Signed at New York in the county of New York and State of New York January, A. D. 1923.

HARRY W. DYER.